US008744659B2

(12) United States Patent
Yamagata et al.

(10) Patent No.: US 8,744,659 B2
(45) Date of Patent: Jun. 3, 2014

(54) REGENERATION CONTROL DEVICE, HYBRID VEHICLE, REGENERATION CONTROL METHOD, AND COMPUTER PROGRAM

(75) Inventors: Keita Yamagata, Tokyo (JP); Akira Sawayama, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 13/813,079

(22) PCT Filed: Oct. 20, 2011

(86) PCT No.: PCT/JP2011/074181
§ 371 (c)(1),
(2), (4) Date: Jan. 29, 2013

(87) PCT Pub. No.: WO2012/096045
PCT Pub. Date: Jul. 19, 2012

(65) Prior Publication Data
US 2013/0131901 A1 May 23, 2013

(30) Foreign Application Priority Data
Jan. 13, 2011 (JP) ................................. 2011-005287

(51) Int. Cl.
*B60L 11/00* (2006.01)
(52) U.S. Cl.
USPC .......................................................... 701/22
(58) Field of Classification Search
CPC ............ B60L 11/00; B60L 9/00; G05D 3/00; G05D 1/00; G06F 7/00; G06F 17/00; G06F 7/70
USPC ......................... 701/22, 36, 48, 54, 56, 69, 70
See application file for complete search history.

(56) References Cited

U.S. PATENT DOCUMENTS

2006/0064225 A1* 3/2006 Tabata et al. ..................... 701/96
2009/0125170 A1* 5/2009 Noffsinger et al. ............. 701/20
2010/0308646 A1* 12/2010 Shimizu ....................... 303/116.2

FOREIGN PATENT DOCUMENTS

JP 2004-251452 A 9/2004
JP 2010-508187 A 3/2010

OTHER PUBLICATIONS

The above references were cited in the International Search Report of the corresponding International Application, PCT/JP2011/074181 dated Nov. 15, 2011.

* cited by examiner

*Primary Examiner* — Kim T Nguyen
(74) *Attorney, Agent, or Firm* — Cowan, Liebowitz & Latman, P.C.; Mark Montague

(57) ABSTRACT

A regeneration control device of a hybrid vehicle comprises a comparison unit for, when a regenerative torque generated in the electric motor is used as a braking force during deceleration of the vehicle using only the electric motor, comparing a preset target deceleration with an actual deceleration; and a control unit for, in a case where the result of comparison of the comparison unit indicates that a state in which the actual deceleration is equal to or lower than the target deceleration occurs in a predetermined pattern though the electric motor is generating the maximum regenerative torque, causing the vehicle to travel using both an engine and the electric motor in a cooperative manner during the next deceleration after the current deceleration has been finished, such that the engine braking and the regeneration torque are both used as a braking force.

8 Claims, 7 Drawing Sheets

REGENERATION CONTROL DEVICE, HYBRID VEHICLE, REGENERATION CONTROL METHOD, AND COMPUTER PROGRAM

CROSS REFERENCE TO RELATED APPLICATIONS

This is a U.S. national stage of application No. PCT/JP2011/074181, filed on Oct. 20, 2011. Priority under 35 U.S.C. §119(a) and 35 U.S.C. §365(b) is claimed from Japanese Patent Application No. 2011-005287, filed on Jan. 13, 2011, the disclosure of which are also incorporated herein by reference.

TECHNICAL FIELD

The present invention relates to a regeneration control device, a hybrid vehicle, a regeneration control method, and a computer program.

BACKGROUND ART

A hybrid vehicle has an engine and an electric motor, can run by the engine or the electric motor, or can run by the cooperation between the engine and the electric motor, and can regeneratively generate power by the electric motor during deceleration. When the regenerative power generation is performed, regenerative torque is generated in the electric motor. The regenerative torque becomes friction in driving the hybrid vehicle to serve as braking force similarly as an engine brake (see for example, Patent Literature PTL1). Note that the regenerative torque of the electric motor is proportional to regenerative power of the electric motor. That is, as the regenerative power of the electric motor increases, the regenerative torque of the electric motor is also larger.

CITATION LIST

Patent Literature

PTL1: JP 2007-223421 A

SUMMARY OF INVENTION

Technical Problem

As described above, the regenerative torque of the electric motor in the hybrid vehicle serves as the braking force similarly as the engine brake. However, when the regenerative torque of the electric motor is used as the braking force of the hybrid vehicle, the braking force may be insufficient according to a weight of a load of the hybrid vehicle or a state of a downhill grade of a road surface on which the hybrid vehicle is driving, and the like. In this situation, there is a case in which the braking force requested by a driver cannot be satisfied and there is a case in which the driver feels insufficiency in braking force as to cause drivability to deteriorate.

The present invention is contrived under the above background and an object of the present invention is to provide a regeneration control device, a hybrid vehicle, a regeneration control method and a computer program that can improve drivability when the regenerative torque of the electric motor is used as the braking force.

Solution to Problem

An aspect of the present invention is a regeneration control device. A regeneration control device of the present invention is a regeneration control device of a hybrid vehicle that includes an engine and an electric motor, that is capable of driving by the engine or the electric motor or capable of driving by a cooperation between the engine and the electric motor, and regeneratively generates power by the electric motor at least during deceleration, and uses regenerative torque generated by the regenerative power generation of the electric motor during the driving by only the electric motor as braking force, comprising: a first comparison unit for, when a regenerative torque generated by regenerative power generation in the electric motor is used as a braking force during deceleration of the hybrid vehicle traveling using only the electric motor, comparing a preset target deceleration with an actual deceleration caused by the regenerative torque generated by the regenerative power generation; and a control unit for, in a case where the result of comparison of the comparison unit indicates that a state in which the actual deceleration is equal to or lower than the target deceleration occurs in a predetermined pattern though the electric motor is generating the maximum regenerative torque, causing the vehicle to travel using both an engine and the electric motor in a cooperative manner during the next deceleration after the current deceleration has been finished, such that the engine braking of the engine and the regeneration torque of the electric motor are both used as a braking force.

For example, the predetermined pattern is a pattern in which the afore-mentioned state is continued for a predetermined time. Alternatively, the predetermined pattern is a pattern in which a state where the afore-mentioned state is continued for the predetermined time is repeated at the predetermined number of times.

Further, the regeneration control device may further include a second comparison unit for, when both the engine brake of the engine and the regenerative torque of the electric motor are used as the braking force, comparing the actual deceleration obtained by using both the engine brake of the engine and the regenerative torque of the electric motor as the braking force with the target deceleration, wherein the control unit causes, when a comparison result of the second comparison unit indicates that the actual deceleration reaches the target deceleration and the regenerative torque of the electric motor is equal to or less than a predetermined value, the vehicle to travel using only the electric motor to use the regenerative torque of the electric motor as the braking force.

Further, the control unit may perform deceleration by only the electric motor in the first deceleration from the time the hybrid vehicle started in order to use regenerative torque generated by the regenerative power generation of the electric motor as the braking force.

Another aspect of the present invention is a hybrid vehicle. The hybrid vehicle of the present invention has the regeneration control device of the present invention.

Yet another aspect of the present invention is a regeneration control method. The regenerator control method of the present invention is a regenerator control method of a hybrid vehicle that includes an engine and an electric motor, that is capable of driving by the engine or the electric motor or capable of driving by cooperation of the engine and the electric motor, and regeneratively generates power by the electric motor at least during deceleration, and uses regenerative torque generated by the regenerative power generation of the electric motor during the driving by only the electric motor as braking force including: a first comparison step for, when a regenerative torque generated by regenerative power generation in the electric motor is used as a braking force during deceleration of the hybrid vehicle traveling using only the electric motor, comparing a preset target deceleration with an actual deceleration caused by the regenerative torque generated by the regenerative power generation; a step of controlling for, in a case where the result of comparison of the comparison unit indicates that a state in which the actual deceleration is equal to or lower than the target deceleration occurs in a predetermined pattern though the electric motor is generating the maximum regenerative torque, causing the vehicle to travel using both an engine and the electric motor in a cooperative manner during the next deceleration after the current deceleration has been finished, such that the engine braking of the engine and the regeneration torque of the electric motor are both used as a braking force; a second comparison step for, when both the engine brake of the engine and the regenerative torque of the electric motor are used as the braking force, comparing the actual deceleration obtained by using both the engine brake of the engine and the regenerative torque of the electric motor as the braking force with the target deceleration; and a step of controlling for, when a comparison result of the second comparison unit indicates that the actual deceleration reaches the target deceleration and the regenerative torque of the electric motor is equal to or less than a predetermined value, causing the vehicle to travel using only the electric motor to use the regenerative torque of the electric motor as the braking force.

Still another aspect of the present invention is a computer program. The computer program of the present invention implements function of the regeneration control device of the present invention in an information processing device.

Advantageous Effect of Invention

According to the present invention, the drivability when the regenerative torque of the electric motor is used as the braking force can be improved.

DESCRIPTION OF EMBODIMENTS

Hereinafter, a hybrid vehicle according to embodiments of the present invention will be described with reference to FIGS. 1 to 10.

Figure 1:
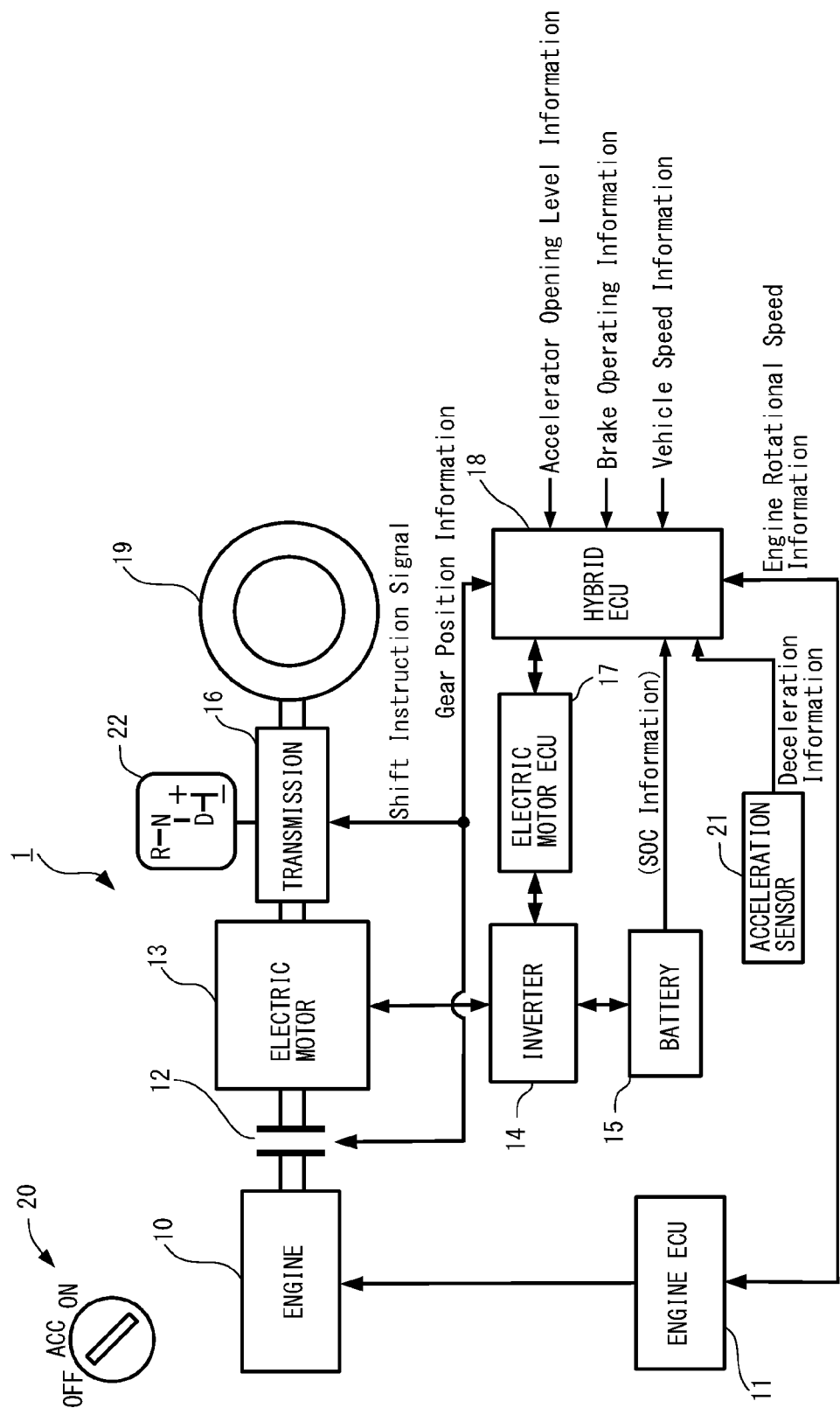
FIG. 1 is a block diagram illustrating an exemplary structure of a hybrid vehicle according to an embodiment of the present invention.

FIG. 1 is a block diagram illustrating an exemplary structure of a hybrid vehicle 1. The hybrid vehicle 1 is one example of an vehicle. The hybrid vehicle 1 is driven by an engine (internal combustion engine) 10 and/or an electric motor 13 through a transmission of a semi-automatic transmission and can generate braking force like an engine brake of an engine 10 by regenerative torque of the electric motor 13 during deceleration. Note that the semiautomatic transmission is a transmission that can automatically shift the gears while having the same structure as a manual transmission.

The hybrid vehicle 1 includes an engine 10, an engine ECU (electronic control unit) 11, a clutch 12, an electric motor 13, an inverter 14, a battery 15, a transmission 16, an electric motor ECU 17, a hybrid ECU 18, an vehicle wheel 19, a key switch 20, an acceleration sensor 21, and a shift unit 22. Note that the transmission 16 includes the above-mentioned semi-automatic transmission, and is operated by the shift unit 22 including a drive range (hereinafter, referred to as a D (Drive) range). When the shift unit 22 is in the D range, the shifting operation of the semi-automatic transmission is automated.

The engine 10 is an example of an internal combustion engine, and is controlled by the engine ECU 11. The engine 10 internally combusts gasoline, light oil, Compressed Natural Gas (CNG), Liquefied Petroleum Gas (LPG), alternative fuel, or the like in order to generate power for rotating a shaft and transmit the generated power to the clutch 12.

The engine ECU 11 is a computer working in coordination with the motor ECU 17 according to the instructions from the hybrid ECU 18, and controls the engine 10, for example, the amount of fuel injection and the valve timing. For example, the engine ECU 11 includes a Central Processing Unit (CPU), an Application Specific Integrated Circuit (ASIC), a microprocessor, a Digital Signal Processor (DSP), and the like, and internally has an operation unit, a memory, an Input/Output (I/O) port, and the like.

The clutch 12 is controlled by the hybrid ECU 18, and transmits the shaft output from the engine 10 to the wheel 19 through the electric motor 13 and the transmission 16. In other words, the clutch 12 mechanically connects the rotating shaft of the engine 10 to the rotating shaft of the electric motor 13 by the control of the hybrid ECU 18 in order to transmit the shaft output of the engine 10 to the electric motor 13. On the other hand, the clutch 12 cuts the mechanical connection between the rotating shaft of the engine 10 and the rotating shaft of the electric motor 13 so that the shaft of the engine 10 and the rotating shaft of the electric motor 13 can rotate at different rotational speeds from each other.

For example, the clutch 12 mechanically connects the rotating shaft of the engine 10 to the rotating shaft of the electric motor 13, for example, when the hybrid vehicle 1 runs by the power of the engine 10 and this causes the electric motor 13 to generate electric power, when the driving force of the electric motor 13 assists the engine 10, and when the electric motor 13 starts the engine 10.

Further, for example, the clutch 12 cuts the mechanical connection between the rotating shaft of the engine 10 and the rotating shaft of the electric motor 13 when the engine 10 stops or is in an idling state and the hybrid vehicle 1 runs by the driving force of the electric motor 13, and when the hybrid vehicle 1 reduces the speed or runs on the down grade and the electric motor 13 generates electric power (regenerates electric power) while the engine 10 stops or is in an idling state.

Note that the clutch 12 differs from the clutch operated by the driver's operation of a clutch pedal, and is operated by the control of the hybrid ECU 18.

The electric motor 13 is a so-called motor generator that supplies a shaft output to the transmission 16 by generating the power for rotating the shaft using the electric power supplied from the inverter 14, or that supplies electric power to the inverter 14 by generating the electric power using the power for rotating the shaft supplied from the transmission 16. For example, when the hybrid vehicle 1 gains the speed or runs at a constant speed, the electric motor 13 generates the power for rotating the shaft to supply the shaft output to the transmission 16 in order to cause the hybrid vehicle 1 to run in cooperation with the engine 10. Further, the electric motor 13 works as an electric generator, for example, when the electric motor 13 is driven by the engine 10, or when the hybrid vehicle 1 runs without power, for example, the hybrid vehicle 1 reduces the speed or runs on the down grade. In that case, electric power is generated by the power for rotating the shaft supplied from the transmission 16 and is supplied to the inverter 14 in order to charge the battery 15. As described above, in the state in which the electric motor 13 is power-generated, the hybrid vehicle 1 performs "regeneration to the battery 15". In this state, the electric motor 13 generates regenerative torque having a magnitude depending on the regenerative power.

The inverter 14 is controlled by the motor ECU 17, and converts the direct voltage from the battery 15 into an alternating voltage or converts the alternating voltage from the electric motor 13 into a direct voltage. When the electric motor 13 generates power, the inverter 14 converts the direct voltage from the battery 15 into an alternating voltage and supplies the electric power to the electric motor 13. When the electric motor 13 generates electric power, the inverter 14 converts the alternating voltage from the electric motor 13 into a direct voltage. In other words, in that case, the inverter 14 works as a rectifier and a voltage regulator for supplying a direct voltage to the battery 15.

The battery 15 is a secondary cell capable of being charged and discharged. The battery 15 supplies electric power to the electric motor 13 through the inverter 14 when the electric motor 13 generates power. Alternatively, the battery 15 is charged with the electric power generated by the electric motor 13 when the electric motor 13 generates electric power. In the battery 15, a range of an appropriate charge state (hereinafter, referred to as an SOC (state of charge)) is determined and the battery 15 is managed so that the SOC does not deviate from the range.

The transmission 16 includes a semiautomatic transmission (not shown in the drawings) that selects one of a plurality of gear ratios (change gear ratios) according to the signal to instruct to shift gears from the hybrid ECU 18 in order to shift the change gear ratios and transmit the gear-shifted power of the engine 10 and/or of the electric motor 13 to the wheel 19. Alternatively, the transmission 16 transmits the power from the wheel 19 to the electric motor 13, for example, when the vehicle reduces the speed or runs on the down grade. Note that the semiautomatic transmission can also shift the gear position to a given gear number by the driver's hand operation of the shift unit 22.

The motor ECU 17 is a computer working in coordination with the engine ECU 11 according to the instructions from the hybrid ECU 18, and controls the electric motor 13 by controlling the inverter 14. For example, the motor ECU 17 includes a CPU, an ASIC, a microprocessor, a DSP, and the like, and internally has an operation unit, a memory, an I/O port, and the like.

The hybrid ECU 18 is one example of the computer, and controls, for hybrid driving, the clutch 12 and supply the signal to instruct to shift gears in order to control the transmission 16 based on accelerator opening level information, brake operating information, vehicle speed information, gear position information acquired from the transmission 16, engine rotational speed information acquired from the engine ECU 11 and SOC information acquired from the battery 15, and instructs the electric motor ECU 17 to control the electric motor 13 and the inverter 14 and instructs the engine ECU 11 to control the engine 10. The control instructions include also a regenerative control instruction which will be described below. For example, the hybrid ECU 18 includes a CPU, an ASIC, a microprocessor, a DSP, and the like and internally has an arithmetic logical unit, a memory, an I/O port, and the like.

Note that a computer program to be executed by the hybrid ECU 18 can be installed on the hybrid ECU 18 that is a computer in advance by being stored in a non-volatile memory inside the hybrid ECU 18 in advance.

The engine ECU 11, the motor ECU 17, and the hybrid ECU 18 are connected to each other, for example, through a bus complying with the standard of the Control Area Network (CAN) or the like.

The wheel 19 is a drive wheel for transmitting the driving force to the road surface. Note that, although only a wheel 19 is illustrated in FIG. 1, the hybrid vehicle 1 actually includes a plurality of the wheels 19.

The key switch 20 is a switch that is turned ON/OFF, for example, by insertion of a key by the user at the start of drive. Turning ON the switch activates each unit of the hybrid vehicle 1, and turning OFF the key switch 20 stops each unit of the hybrid vehicle 1.

The acceleration sensor 21 senses an acceleration of the hybrid vehicle 1 and transfers the sensed acceleration to the hybrid ECU 18 as acceleration information. However, in the embodiment, since the hybrid ECU 18 acquires deceleration information of the hybrid vehicle 1 from the acceleration sensor 21, in FIG. 1, it is illustrated that the deceleration information is transferred from the acceleration sensor 21 to the hybrid ECU 18.

The shift unit 22 gives an instruction received from the driver to the semi-automatic transmission of the transmission 16 as described already and when the shift unit 22 is in the D range, the shifting operation of the semi-automatic transmission is automated.

Figure 2:
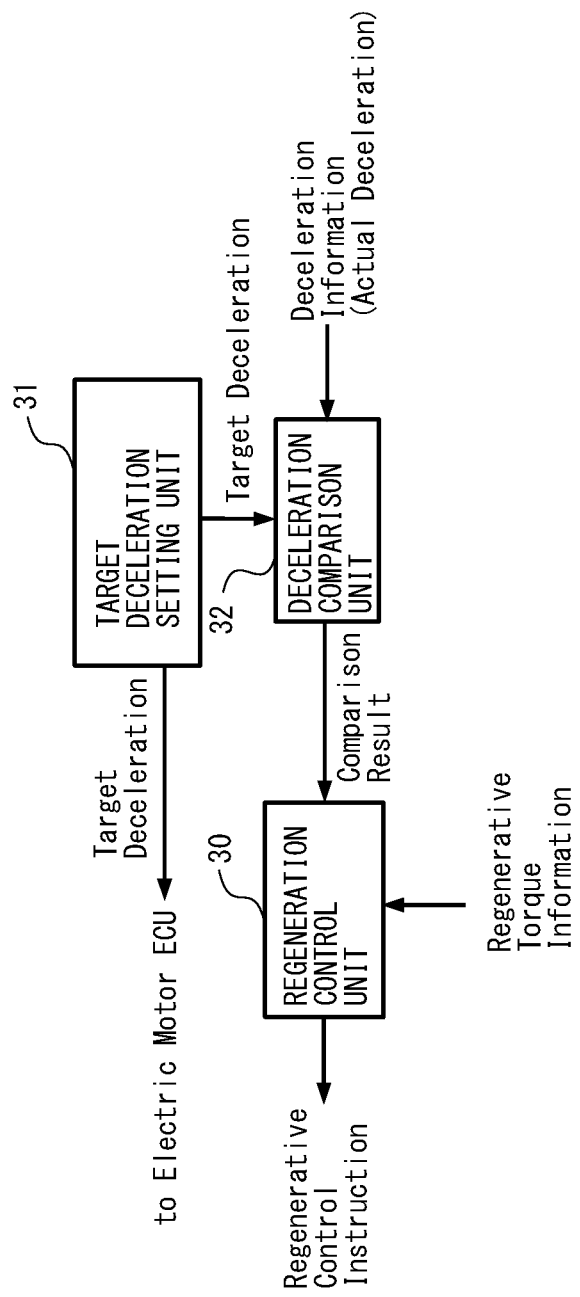
FIG. 2 is a block diagram illustrating an exemplary configuration of a function implemented in a hybrid ECU of FIG. 1.

FIG. 2 is a block diagram illustrating a configuration example of a function implemented in the hybrid ECU 18 that executes the computer program. In other words, when the hybrid ECU 18 executes the computer program, functions of a regeneration control unit 30, a target deceleration setting unit 31, and a deceleration comparison unit 32 are implemented.

The regeneration control unit 30 serves to give an instruction of a regenerative control to the engine ECU 11, the clutch 12, the inverter 14, and the electric motor ECU 17 based on both a comparison result of a target deceleration and an actual deceleration output from the deceleration comparison unit 32 and regenerative torque information transferred from the electric motor ECU 17. Note that the regeneration control unit 30 may acquire regenerative power information from the electric motor ECU 17 instead of the regenerative torque information and may acquire regenerative torque proportional to regenerative power through calculation.

The target deceleration setting unit 31 serves to set the target deceleration. The target deceleration is a target value of braking force generated by the regenerative torque which is determined in advance when the electric motor 13 performs regenerative power generation. Setting the target deceleration enables the hybrid ECU 18 to appropriately perform scheduling and the like when the braking force by the regenerative torque of the electric motor 13 and the engine brake are used together. The target deceleration is also transferred to the electric motor ECU 17, and the electric motor ECU 17 performs a control so that the braking force generated by the regenerative torque of the electric motor 13 approximates to the target deceleration.

The deceleration comparison unit 32 serves to compare the target deceleration set by the target deceleration setting unit 31 and an actual deceleration of the hybrid vehicle 1 (referred to as an actual deceleration) acquired from the deceleration information of the acceleration sensor 21.

Figure 3:
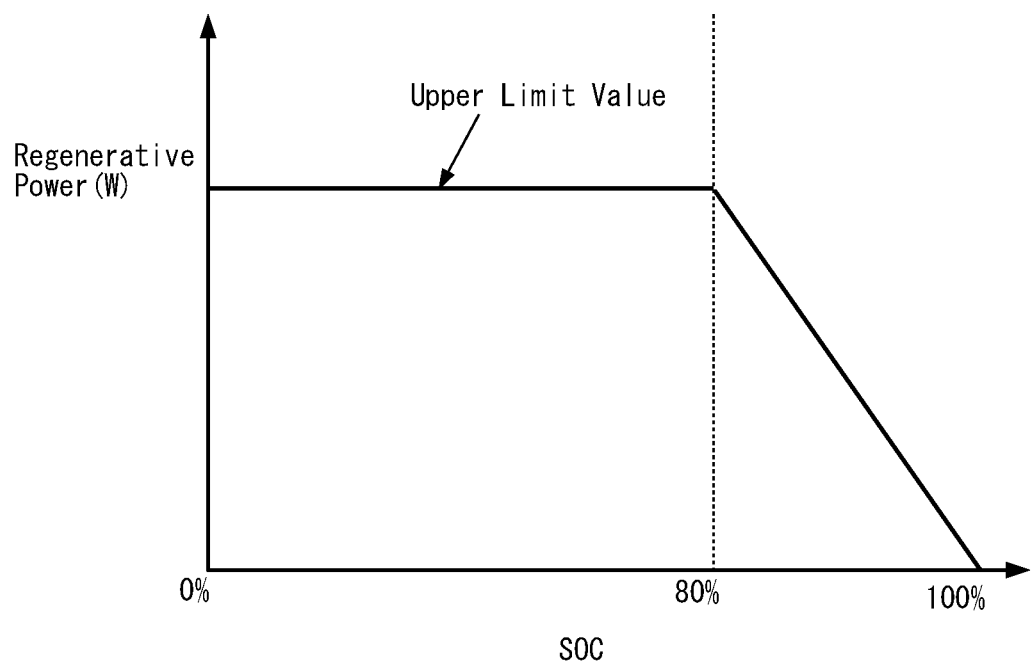
FIG. 3 is a diagram illustrating the relationship between an SOC (state of charge) of a battery and an upper limit value of regenerative power of an electric motor.

Herein, the relationship between the SOC of the battery 15 and the regenerative power will be described below with reference to FIG. 3. FIG. 3 is a diagram illustrating the relationship between the SOC of the battery 15 and an upper limit value of the regenerative power, in which the SOC is set on a horizontal axis and the regenerative power is set on a vertical axis. Note that the target deceleration is a predetermined value and for example, is determined in advance as 50% to 70% of the braking force of the engine brake by the engine 10. A value of the target deceleration corresponding to the SOC is set in advance by map information and the like, and for example, pre-stored in the memory of the hybrid ECU 18.

As illustrated in FIG. 3, when the SOC of the battery 15 is in the range of 0% to 80%, the upper limit value of the regenerative power for the battery 15 is almost constant. But when the SOC is more than 80%, the range of the upper limit value of the regenerative power for the battery 15 is narrowed in order to prevent the battery 15 from being overcharged. The regeneration control unit 30 controls the braking force generated by the regenerative torque of the electric motor 13 to achieve a predetermined target deceleration when the SOC is equal to or less than 80%. On the other hand, when the SOC is more than 80%, the range of the regenerative power is slowly narrowed. And as a result, the range of the regenerative torque is also narrowed. Therefore, the situation in which the target deceleration set by the target deceleration setting unit 31 is not reached occurs even though maximum regenerative torque of the electric motor 13 is provided.

Further, an another situation in which the target deceleration set by the target deceleration setting unit 31 is not reached even though the maximum regenerative torque of the electric motor 13 is provided occurs when the hybrid vehicle 1 is running on the steep downhill grade beyond an assumed range when a load of the hybrid vehicle 1 is in a constant volume state. The regeneration control unit 30 performs a control to supplement insufficiency of the maximum regenerative torque under this situation as described below. That is, the regeneration control unit 30 performs a control so that the deceleration by the engine brake is added to the deceleration by the regenerative torque to satisfy the target deceleration regardless of driver's manipulation when the deceleration by the regenerative torque of the electric motor 13 does not reach the target deceleration. In addition to the example, when the driver additionally needs the deceleration, the driver steps on a service brake or operates auxiliary brakes (a retarder, an exhaust brake, an engine retarder, and the like).

Note that in a general driving state in which the SOC of the battery 15 is equal to or less than 80%, the target deceleration setting unit 31 is configured not to excessively set the target deceleration that cannot be reached even though the maximum regenerative torque of the electric motor 13 is provided. Herein, the general driving state denotes the state in which the load of the hybrid vehicle 1 is in the constant volume state and the hybrid vehicle 1 is running on the downhill grade (a degree thereof is various depending on the performance of the vehicle) within the assumed range.

Next, process I of the regenerative control performed by the hybrid ECU 18 executing the computer program will be described with reference to flowcharts of FIGS. 4 and 5. Note that a flow of steps S1 to S9 of FIG. 4 corresponds to process for one cycle and the process is repeatedly executed as long as the key switch 20 is in the ON state. In addition, flow process of steps S20 to S23 illustrated in FIG. 5 is executed together with the flow process of steps S1 to S9 illustrated in FIG. 4.

Figure 4:
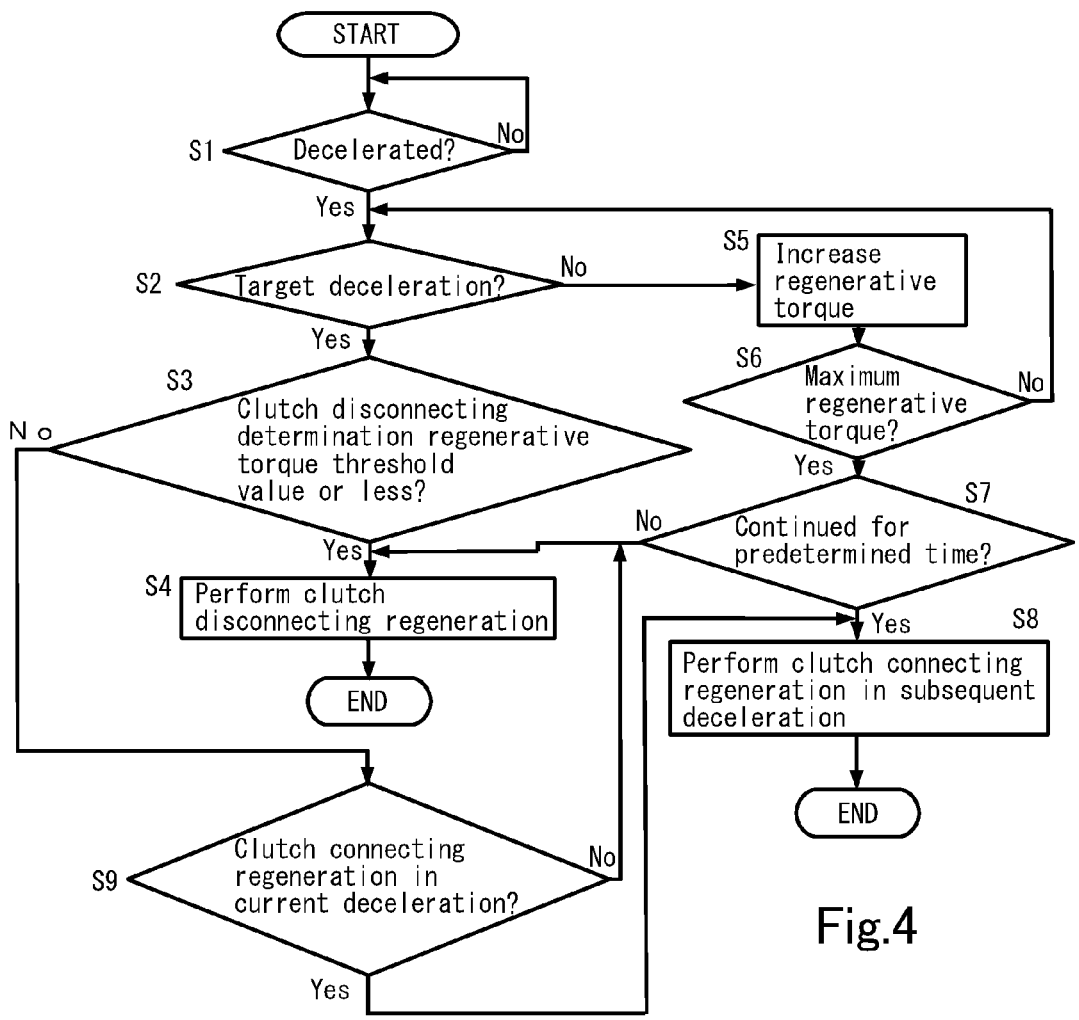
FIG. 4 is a flowchart illustrating process I to be carried out by a regeneration control unit of FIG. 2.
Figure 5:
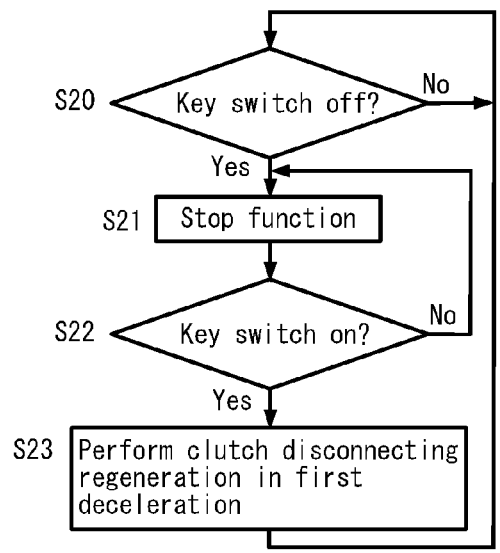
FIG. 5 is a flowchart illustrating process associated with ON/OFF of a key switch in the process of the regeneration control unit (process I) of FIG. 2.

In "START" of FIG. 4, the key switch 20 is in the ON state, the hybrid ECU 18 executes the computer program, and the functions of the regeneration control unit 30, the target deceleration setting unit 31, and the deceleration comparison unit 32 are implemented in the hybrid ECU 18, and the process proceeds to step S1. Note that at the time of "START", any one of processes of steps S4, S8, and S23 (FIG. 5) described below is executed. At this time, the hybrid vehicle 1 is in a state in which clutch disconnecting regeneration is performed. However, at the time of "START", in the case where the process of step S8 is performed, when it is determined that deceleration is achieved in the process of step S1 just after "START", the hybrid vehicle 1 is transited from the clutch disconnecting regeneration to clutch connecting regeneration.

In step S1, the deceleration comparison unit 32 determines whether the hybrid vehicle 1 is decelerated according to the deceleration information of the acceleration sensor 21. In step S1, when it is determined that the hybrid vehicle 1 is decelerated, the process proceeds to step S2. On the other hand, in step S1, when it is determined that the hybrid vehicle 1 is not decelerated, the process in step S1 is repeated.

In step S2, the deceleration comparison unit 32 compares the target deceleration set by the target deceleration setting unit 31 and the actual deceleration of the hybrid vehicle 1 based on the deceleration information acquired from the acceleration sensor 21 to determine whether the actual deceleration reaches the target deceleration. In step S2, when it is determined that the actual deceleration reaches the target deceleration, the process proceeds to step S3. On the other hand, in step S2, when it is determined that the actual deceleration does not reach the target deceleration, the process proceeds to step S5.

In step S3, the regeneration control unit 30 determines whether current regenerative torque of the electric motor 13 is equal to or less than a "clutch disconnecting determination regenerative torque threshold value (a predetermined value disclosed in claims)" according to the regenerative torque information transferred from the electric motor ECU 17. Note that the "clutch disconnecting determination regenerative torque threshold value" will be described below in detail, and is a threshold which is lower than the maximum regenerative torque by approximately 10% to 20% thereof. In step S3, when it is determined that the current regenerative torque of the electric motor 13 is equal to or less than the "clutch disconnecting determination regenerative torque threshold value", the process proceeds to step S4. On the other hand, in step S3, when it is determined that the current regenerative torque of the electric motor 13 is more than the "clutch disconnecting determination regenerative torque threshold value", the process proceeds to step S11.

In step S4, the regeneration control unit 30 instructs the engine ECU 11, the clutch 12, the inverter 14, and the electric motor ECU 17 on the "clutch disconnecting regeneration" in which regeneration is performed with the clutch 12 being disconnected to end the process for one cycle (END).

In step S5, the regeneration control unit 30 instructs the inverter 14 and the electric motor ECU 17 to increase the regenerative torque and the process then proceeds to step S6.

In step S6, the regeneration control unit 30 determines whether the regenerative torque reaches the maximum regenerative torque as a result of increasing the regenerative torque in step S5. Note that the maximum regenerative torque denotes regenerative torque generated by performing regeneration by the electric motor 13 with regenerative power substantially equivalent to an upper limit value of the regenerative power set with respect to the current SOC of the battery 15. In step S6, when it is determined that the regenerative torque reaches the maximum regenerative torque, the process proceeds to step S7. On the other hand, in step S6, when it is determined that the regenerative torque has not yet reached the maximum regenerative torque, the process returns to step S2.

In step S7, the regeneration control unit 30 determines whether a state of the maximum regenerative torque selected as Yes in step S6 has continued for a predetermined time. Herein, the predetermined time is for example, tens of seconds (for example, 15 seconds). In step S7, when it is determined that the corresponding state has continued for the predetermined time, the process proceeds to step S8. On the other hand, in step S7, when it is determined that the corresponding state has not continued for the predetermined time, the process returns to step S4.

In step S8, the regeneration control unit 30 instructs the engine ECU 11, the clutch 12, the inverter 14, and the electric motor ECU 17 on a "clutch connecting regeneration" in which regeneration is performed with the clutch 12 being connected in subsequent deceleration to end the processing for one cycle (END). In other words, the regeneration control unit 30 controls the "clutch disconnecting regeneration" to be continued as it is during current deceleration and the "clutch connecting regeneration" to be performed during the subsequent deceleration.

In step S9, the regeneration control unit 30 determines whether the clutch disconnecting regeneration is performed during the current deceleration. Note that the regeneration control unit 30 stores the state (the clutch connecting regeneration or not) during the current deceleration in a part of a memory area of the hybrid ECU 18. In step S9, when it is determined that the clutch connecting regeneration is performed during the current deceleration, the process returns to step S8. On the other hand, in step S9, when it is determined that the clutch connecting regeneration is not performed during the current deceleration, the process returns to step S4.

Further, as illustrated in FIG. 5, in step S20, the regeneration control unit 30 determines whether the key switch 20 of the hybrid vehicle 1 is in the OFF state. In step S20, when it is determined that the key switch 20 is in the OFF state, the process proceeds to step S21. On the other hand, in step S20, when it is determined that the key switch 20 is not in the OFF state, the process in step S20 is repeated.

In step S21, the function of the regeneration control unit 30 stops and the process proceeds to step S22.

In step S22, the regeneration control unit 30 determines whether the key switch 20 of the hybrid vehicle 1 has been turned ON. In step S22, when it is determined that the key switch 20 has been turned ON, the process proceeds to step S23. On the other hand, in step S22, when it is determined that the key switch 20 has not been turned ON, the process returns to step S21.

In step S23, the regeneration control unit 30 performs the clutch disconnecting regeneration when the key switch 20 of the hybrid vehicle 1 has been turned ON and in first deceleration after the start of operation of the hybrid vehicle 1, and then the process returns to step S20.

Note that in the process of step S7 of FIG. 4, it is determined whether the maximum regenerative torque selected as Yes in step S6 has continued for the predetermined time to determine whether the hybrid vehicle 1 is running on for example, a long downhill grade. That is, when the state of Yes in step S6 continued for, for example, 15 seconds, it may be determined that the hybrid vehicle 1 is running on the long downhill grade. As a result, the frequent switching of the clutch disconnecting regeneration and the clutch connecting regeneration may be avoided in a road surface environment in which a short downhill grade is off and on.

Next, process II of the regenerative control performed by the hybrid ECU 18 that executes the computer program will be described with reference to a flowchart of FIG. 6. Note that in the flowchart of FIG. 6, step S7 in the flowchart of FIG. 4 is changed to step S10. Therefore, a process of step S10 will be described and the processes of steps S1 to S6, S8, and S9 will not be described. Further, the flow process of FIG. 5 is also executed together with the flow process of FIG. 6.

In step S10, the regeneration control unit 30 determines whether the state of the maximum regenerative torque selected as Yes in step S6 is on and off at the predetermined number of times within a predetermined time. Herein, the predetermined time denotes for example, tens of seconds (for example, 30 seconds). Further, the predetermined number of times denotes for example, several times (for example, three times). In step S10, when it is determined that the corresponding state is on and off at the predetermined number of times within the predetermined time, the process proceeds to step S8. On the other hand, in step S10, when it is determined that the corresponding state is not on and off at the predetermined number of times within the predetermined time, the process returns to step S4.

Figure 6:
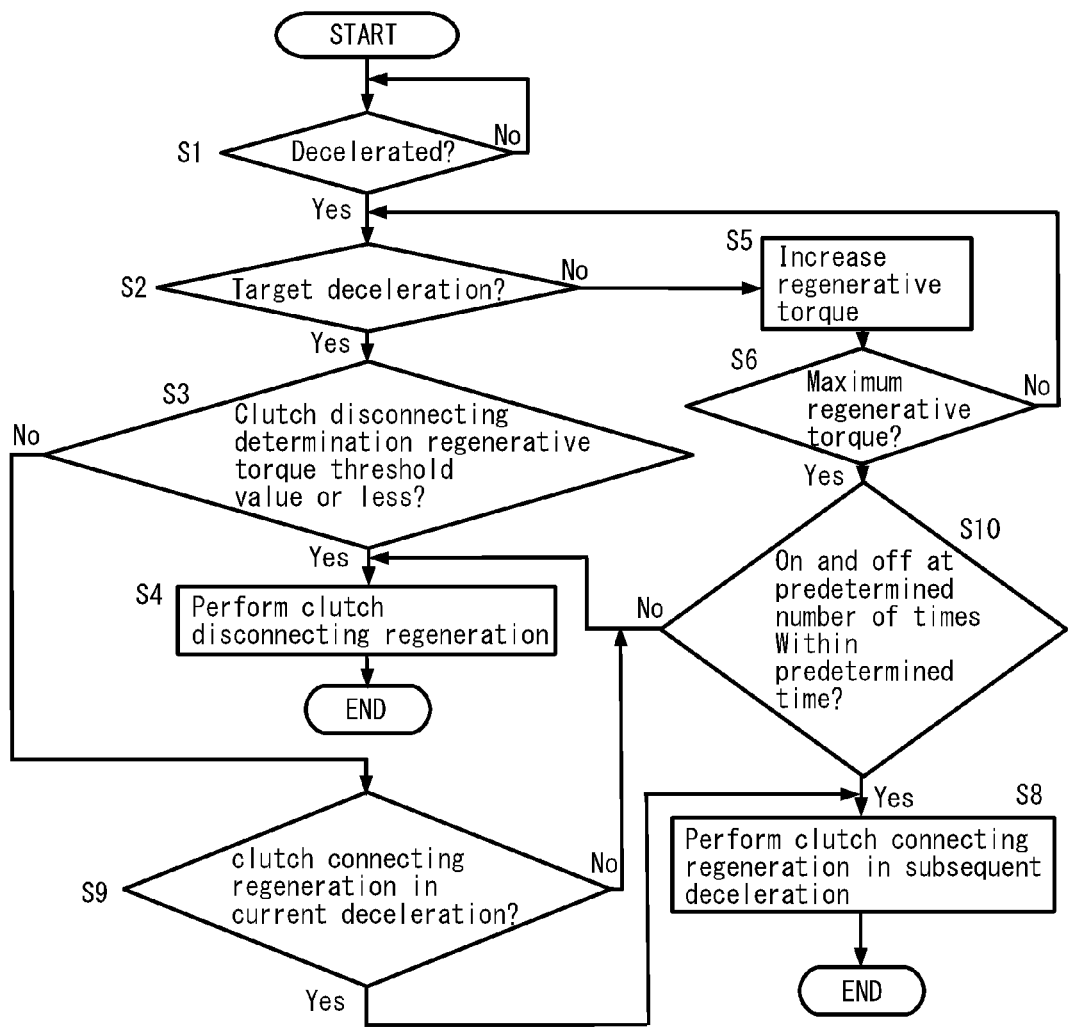
FIG. 6 is a flowchart illustrating process II to be carried out by the regeneration control unit (process II) of FIG. 2.

Note that in the process of step S10 of FIG. 6, it is determined whether the maximum regenerative torque selected as Yes in step S6 is on and off at the predetermined number of times within the predetermined time to determine whether the hybrid vehicle 1 is running on for example, the long downhill grade. That is, when the state of Yes in step S6 is on and off for example, at three times within 30 seconds, it may be determined that the hybrid vehicle 1 is running on the long downhill grade. In addition, it is considered that a cause of the state of Yes in step S6 being on and off is that since the hybrid vehicle 1 is accelerated due to insufficient braking force, the driver uses the service brake or the auxiliary brake, and as a result, the hybrid vehicle 1 is once decelerated, but when the driver stops using the service brake or the auxiliary brake, a state in which the hybrid vehicle 1 is again accelerated is repeated. As a result, the frequent switching of the clutch disconnecting regeneration and the clutch connecting regeneration may be avoided in the road surface environment in which the short downhill grade is off and on.

(In Regard to Effects)

In describing the effects of the embodiment, a case in which the actual deceleration falls short of the target deceleration will be described with reference to FIG. 7, a case in which insufficient regenerative torque is generated with respect to the maximum regenerative torque will be described with reference to FIG. 8, a case in which the actual deceleration follows the target deceleration will be described with reference to FIG. 9, and a case in which actual regenerative torque is equal to or less than the clutch disconnecting determination regenerative torque threshold value will be described with reference to FIG. 10.

Figure 7:
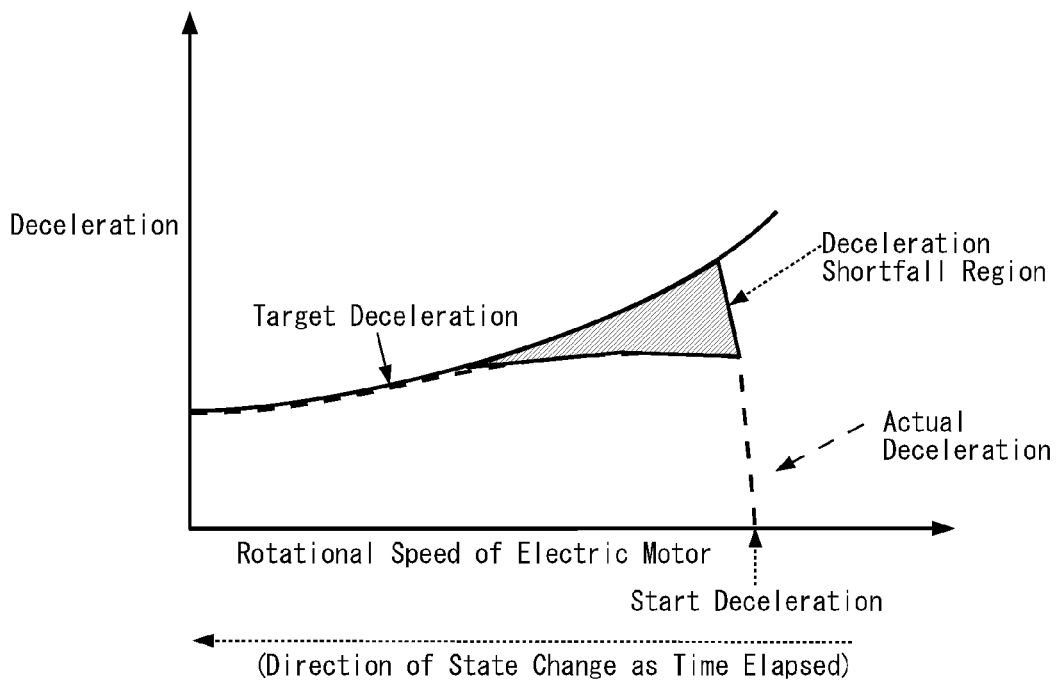
FIG. 7 is a diagram illustrating the relationship between a deceleration and a rotational speed of the electric motor in a regenerative control of the regeneration control unit of FIG. 2 and illustrates a case in which an actual deceleration falls short of a target deceleration.
Figure 8:
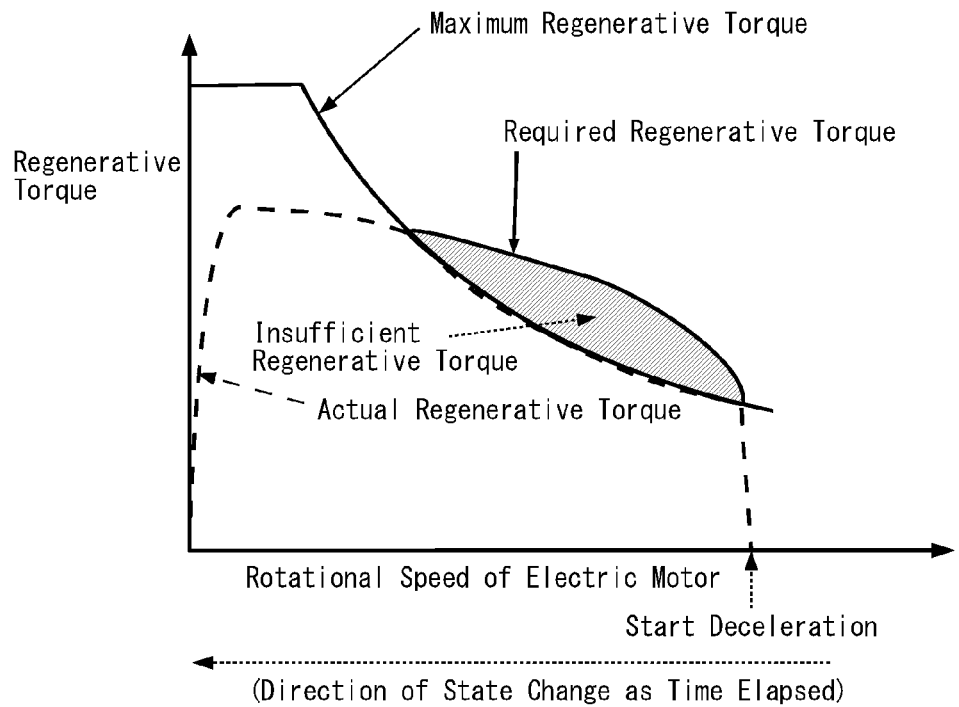
FIG. 8 is a diagram illustrating the relationship between regenerative torque and the rotational speed of the electric motor in the regenerative control of the regeneration control unit of FIG. 2 and illustrates a case in which insufficient regenerative torque is generated with respect to maximum regenerative torque.
Figure 9:
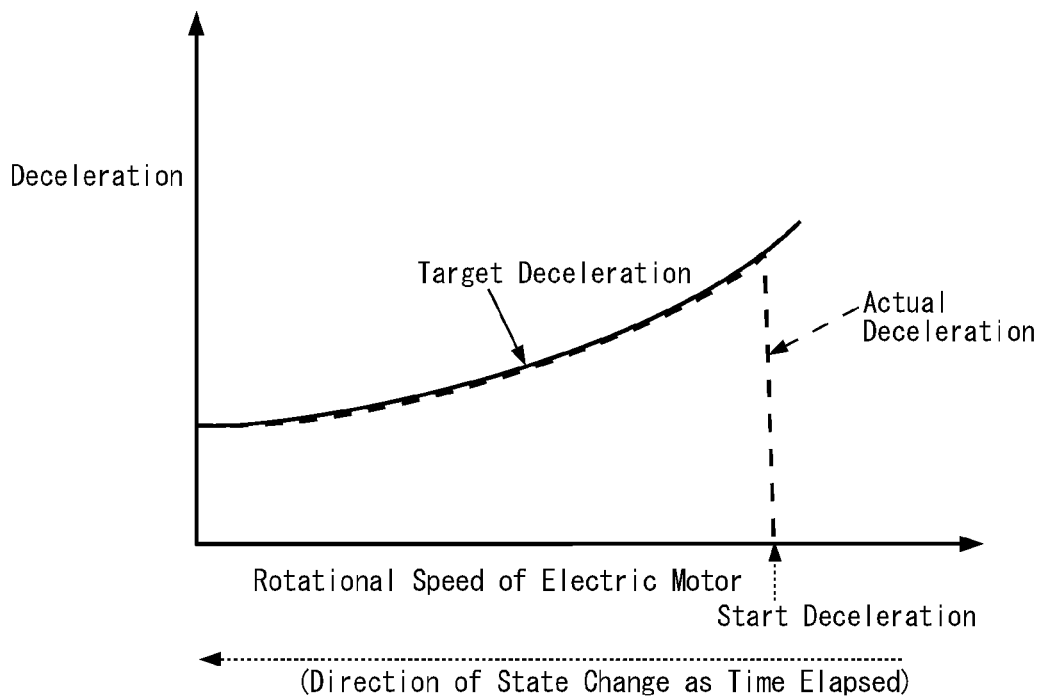
FIG. 9 is a diagram illustrating the relationship between the deceleration and the rotational speed of the electric motor in the regenerative control of the regeneration control unit of FIG. 2 and illustrates a case in which the actual deceleration follows the target deceleration.

In FIGS. 7 and 9, a rotational speed of the electric motor is set on a horizontal axis and deceleration is set on a vertical axis. In FIGS. 8 and 10, the rotational speed of the electric motor is set on a horizontal axis and regenerative torque is set on a vertical axis. In the states of FIGS. 7 to 10, the hybrid vehicle 1 is being decelerated. Therefore, the rotational speed of the electric motor on the horizontal axis of FIGS. 7 to 10 is changed from the right side (a high side) to a left side (a lower side) as time elapsed.

As illustrated in FIG. 7, when deceleration of the hybrid vehicle 1 is started, the actual deceleration (dotted line) by the regenerative torque of the electric motor 13 is controlled to be approximate to the target deceleration (solid line). In an example of FIG. 7, the actual deceleration is lower than the target deceleration, and a deceleration shortfall region is generated as expressed by hatching. Therefore, the driver feels that the deceleration is insufficient. Further, in this case, as illustrated in FIG. 8, a region of insufficient regenerative torque (hatching part) in which the actual regenerative torque falls short of required regenerative torque is generated.

Contrary to this, the regeneration control unit 30 performs a control so that the actual deceleration (dotted line) approximates to the target deceleration (solid line) by, in parallel, using the deceleration by the regenerative torque of the electric motor 13 and the deceleration by the engine brake of the engine 10 together when the hybrid vehicle 1 is decelerated next time, as illustrated in FIG. 9. Therefore, the driver may acquire excellent drivability without feeling that the deceleration is insufficient.

Figure 10:
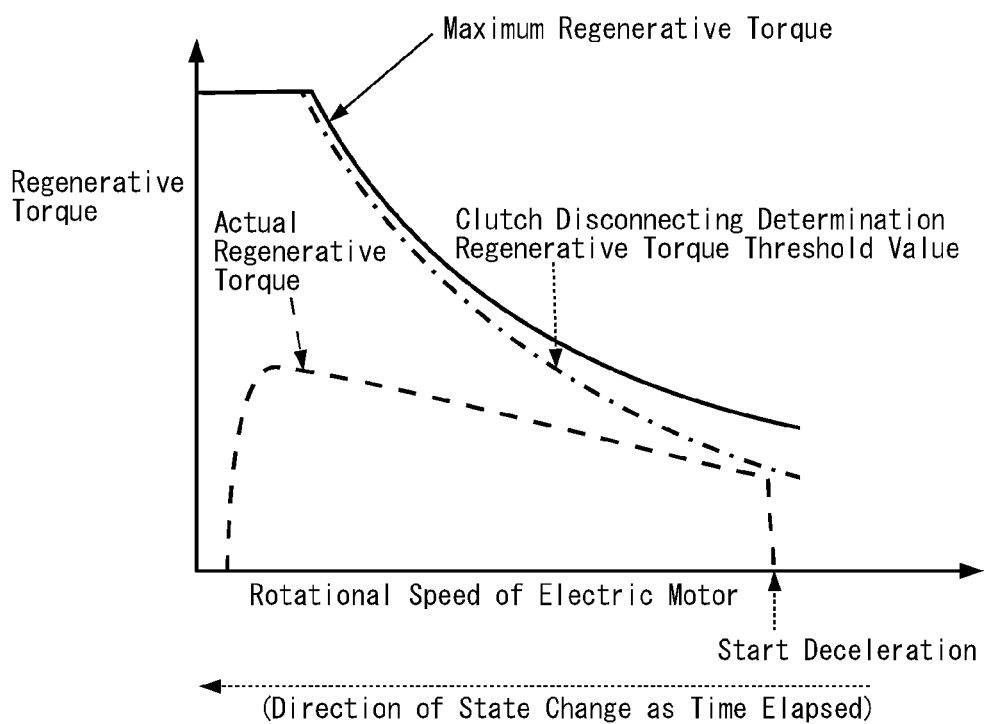
FIG. 10 is a diagram illustrating the relationship between the regenerative torque and the rotational speed of the electric motor in the regenerative control of the regeneration control unit of FIG. 2 and illustrates a case in which actual regenerative torque is equal to or less than a clutch disconnecting determination regenerative torque threshold value.

Further, in this case, as illustrated in FIG. 10, the braking force by the regenerative torque of the electric motor 13 is added to the braking force by the engine brake of the engine 10 and the actual regenerative torque of the electric motor 13 is equal to or less than the "clutch disconnecting determination regenerative torque threshold value (alternated long and short dash line)". Therefore, like Yes of step S3 in the flowcharts of FIGS. 4 and 6, the case is in a state in which the clutch disconnecting regeneration is enabled. Note that the "clutch disconnecting determination regenerative torque threshold value" is set to a value which is lower than the maximum regenerative torque by approximately 10% to 20% thereof. When the "clutch disconnecting determination regenerative torque threshold value" is equal to the maximum regenerative torque, a state (referred to as mode hunting) in which the clutch connecting regeneration and the clutch disconnecting regeneration are frequently switched to each other may occur. But the mode hunting may be suppressed by setting the "clutch disconnecting determination regenerative torque threshold value" to the value which is lower than the maximum regenerative torque by approximately 10% to 20% thereof. When the clutch disconnecting regeneration is switched to the clutch connecting regeneration, the engine 10 and the electric motor 13 are synchronized with each other in terms of the rotational speed and the engine 10 is at a higher rotational speed than an idle state to consume fuel, and as a result, the mode hunting is not preferable in terms of improvement of fuel efficiency.

In addition, since the regeneration control unit 30 performs a control so that a timing for the clutch 12 to be in a connection state does not take place during the deceleration (step S8), there is no case in which the driver feels sudden braking shock by the connection of the clutch 12.

Further, according to the processes of step S7 of the flowchart of FIG. 4 and step S10 of the flowchart of FIG. 6, the frequent switching of the clutch disconnecting regeneration and the clutch connecting regeneration may be avoided in the road surface environment in which the short downhill grade is on and off as described above. Even as a result, the number of times where the clutch 12 is connected may be decreased and fuel efficiency may be improved by suppressing a fuel consumption amount of the hybrid vehicle 1 to be low.

Further, according to the processes of steps S20 to S23 of the flowchart of FIG. 5, in the first deceleration after the start of running of the hybrid vehicle, deceleration by only the electric motor 13 never fail to be performed, and deceleration by the regenerative torque is performed with the clutch 12 being disconnected. As a result, since a chance to connect the clutch 12 may be controlled to be decreased as much as possible during the deceleration, the fuel efficiency may be improved by suppressing the fuel consumption amount of the hybrid vehicle 1 to be low.

Furthermore, in the case where the engine 10 is a motive power source of an auxiliary machine (a compressor of a cooling machine, and the like), connecting the clutch 12 on the long downhill grade would make it possible to interrupt fuel injection of the engine 10 to acquire a stable motive power source of the auxiliary machine while saving fuel. Even in this case, when the clutch disconnecting regeneration and the clutch connecting regeneration are frequently switched to each other in the road surface environment in which the short downhill grade is on and off, the engine 10 is not appropriate for the motive power source of the auxiliary machine because the rotational speed of the engine 10 becomes unstable. Even in order to avoid the inappropriate state, the processes of step S7 of the flowchart of FIG. 4 and step S10 of the flowchart of FIG. 6 are valid.

Other Embodiments

In step S4 of the flowcharts of FIGS. 4 and 6, the "clutch disconnecting regeneration" is performed immediately after Yes is selected in step S3. Contrary to this, step S4 may be changed to the "clutch disconnecting regeneration from the next time" so that the clutch disconnecting regeneration is performed when the hybrid vehicle 1 is decelerated next time after Yes in step S3 is selected. Therefore, since the clutch 12 is not disconnected while the hybrid vehicle 1 is decelerated, it is possible to prevent the driver from feeling shock. Note that even though the clutch 12 is disconnected during the deceleration, since the braking force by the regenerative torque of the electric motor 13 is sufficient, the driver feels very small shock. Accordingly, in general, a need to change step S4 to the "clutch disconnecting regeneration from the next time" is small.

Further, in the description of the flowcharts of FIGS. 4 and 6, boundary values of determination may be variously changed, such as changing "equal to or less than" to "less than" and "more than" to "equal to or more than".

Although it has been described that the engine 10 is the internal combustion engine, the engine 10 may be a heat engine including an external-combustion engine.

Further, although it has been described that the computer program executed by the hybrid ECU 18 is installed in the hybrid ECU 18 in advance, removable media in which the computer program is recorded (which stores the computer program) may be mounted on a drive (not illustrated in the drawings) and the like, the program read from the removable media may be stored in the nonvolatile memory in the hybrid ECU 18, or a program transmitted through wired or wireless transmission media may be received from a communication unit (not illustrated in the drawings) and stored in the nonvolatile memory in the hybrid ECU 18 to be installed in the hybrid ECU 18 as the computer.

In addition, the respective ECUs may be implemented by an ECU formed by organizing the ECUs into one or an ECU having additionally subdivided functions of the respective ECUs may be newly formed.

Further, the computer program executed by the computer may be a computer program which is processed in time series according to the sequence described in the specification or a computer program which is processed in parallel, or at a needed timing such as the time when calling is received.

In addition, the embodiments of the present invention are not limited to the afore-mentioned embodiments and may be variously changed without departing from the spirit of the present invention.

The invention claimed is:

1. A regeneration control device of a hybrid vehicle that includes an engine and an electric motor, that is capable of driving by the engine or the electric motor or capable of driving by a cooperation between the engine and the electric motor, and regeneratively generates power by the electric motor at least during deceleration, and uses regenerative torque generated by the regenerative power generation of the electric motor during the driving by only the electric motor as braking force, comprising:
   a first comparison unit for, when the regenerative torque generated by regenerative power generation in the electric motor is used as the braking force during deceleration of the hybrid vehicle traveling using only the electric motor, comparing a preset target deceleration with an actual deceleration caused by the regenerative torque generated by the regenerative power generation;
   and a control unit for, in a case where a result of comparison of the comparison unit indicates that a state in which the actual deceleration is equal to or lower than the target deceleration occurs in a predetermined pattern though the electric motor is generating maximum regenerative torque, causing the vehicle to travel using both the engine and the electric motor in a cooperative manner during a next deceleration after a current deceleration has been finished, such that engine braking of the engine and the regeneration torque of the electric motor are both used as a braking force.

2. The regeneration control device according to claim 1, wherein
   the predetermined pattern is a pattern in which the state is continued for a predetermined time.

3. The regeneration control device according to claim 1, wherein
   the predetermined pattern is a pattern in which the state where the state is continued for the predetermined time is repeated at a predetermined number of times.

4. The regeneration control device according to claim 1, further comprising:
   a second comparison unit for, when both the engine brake of the engine and the regenerative torque of the electric motor are used as the braking force, comparing the actual deceleration obtained by using both the engine brake of the engine and the regenerative torque of the electric motor as the braking force with the target deceleration,
   wherein the control unit causes, when a comparison result of the second comparison unit indicates that the actual deceleration reaches the target deceleration and the regenerative torque of the electric motor is equal to or less than a predetermined value, the vehicle to travel using only the electric motor to use the regenerative torque of the electric motor as the braking force.

5. The regeneration control device according to claim 1, wherein
   the control unit performs deceleration by only the electric motor in first deceleration from a time the hybrid vehicle started in order to use the regenerative torque generated by the regenerative power generation of the electric motor as the braking force.

6. A hybrid vehicle comprising the regeneration control device according to claim 1.

7. A regeneration control method of a hybrid vehicle that has an engine and an electric motor, is capable of driving by the engine or the electric motor or capable of driving by cooperation of the engine and the electric motor, and regeneratively generates power by the electric motor at least during deceleration, and uses regenerative torque generated by the regenerative power generation of the electric motor during the driving by only the electric motor as braking force, comprising:
   a first comparison step for, when the regenerative torque generated by regenerative power generation in the electric motor is used as the braking force during deceleration of the hybrid vehicle traveling using only the electric motor, comparing a preset target deceleration with an actual deceleration caused by the regenerative torque generated by the regenerative power generation;
   a step of controlling for, in a case where a result of comparison of the comparison unit indicates that a state in which the actual deceleration is equal to or lower than the target deceleration occurs in a predetermined pattern though the electric motor is generating maximum regenerative torque, causing the vehicle to travel using both the engine and the electric motor in a cooperative manner during a next deceleration after a current deceleration has been finished, such that engine braking of the engine and the regeneration torque of the electric motor are both used as a braking force;
   a second comparison step for, when both the engine braking of the engine and the regenerative torque of the electric motor are used as the braking force, comparing the actual deceleration obtained by using both the engine brake of the engine and the regenerative torque of the electric motor as the braking force with the target deceleration; and
   a step of controlling for, when a comparison result of the second comparison unit indicates that the actual deceleration reaches the target deceleration and the regenerative torque of the electric motor is equal to or less than a predetermined value, causing the vehicle to travel using only the electric motor to use the regenerative torque of the electric motor as the braking force.

8. A non-transitory computer readable medium for executing a computer program that implements the regeneration control method according to claim 7 in an information processing device.

* * * * *